United States Patent
Suzuki

(10) Patent No.: US 7,519,399 B2
(45) Date of Patent: Apr. 14, 2009

(54) HANDSFREE DEVICE AND MOBILE PHONE HANDSET

(75) Inventor: Hideaki Suzuki, Nagoya (JP)

(73) Assignee: Denso Corporation, Kariya (JP)

( * ) Notice: Subject to any disclaimer, the term of this patent is extended or adjusted under 35 U.S.C. 154(b) by 593 days.

(21) Appl. No.: 11/201,490

(22) Filed: Aug. 11, 2005

(65) Prior Publication Data

US 2006/0040714 A1 Feb. 23, 2006

(30) Foreign Application Priority Data

Aug. 23, 2004 (JP) ............................. 2004-242465

(51) Int. Cl.
- *H04B 7/00* (2006.01)
- *H04M 1/00* (2006.01)
- *H04N 7/14* (2006.01)

(52) U.S. Cl. .................. 455/569.1; 455/41.1; 455/41.2; 455/41.3; 455/569.2; 455/567; 348/14.02

(58) Field of Classification Search .................. 455/41, 455/569, 567; 348/14.02
See application file for complete search history.

(56) References Cited

U.S. PATENT DOCUMENTS 6,714,233 B2 * 3/2004 Chihara et al. ........... 348/14.02

2003/0045235 A1 * 3/2003 Mooney et al. ................. 455/41
2004/0185915 A1 * 9/2004 Ihara et al. ................. 455/569.1
2006/0019713 A1 * 1/2006 Rokusek et al. .............. 455/563

FOREIGN PATENT DOCUMENTS

JP 2002-237869 8/2002

* cited by examiner

*Primary Examiner*—Matthew D Anderson
*Assistant Examiner*—Wen W Huang
(74) *Attorney, Agent, or Firm*—Harness, Dickey & Pierce, PLC

(57) ABSTRACT

By executing a ring-tone determination program and so on, a handsfree device transmits range information to a mobile phone handset connected with the handsfree device. When the handsfree device receives information of frequency ranges used by ring-tone signals in the handset, it makes a determination according to the received information. If the received information indicates that the handset is compatible with the range information, it transmits a signal for directing not to restrict a frequency range. If the received information indicates that the handset is not compatible with the range information, it transmits either of a signal for directing to restrict a frequency range or a denial signal denying the reception of ring-tone sound, depending on a setting in the handsfree device.

12 Claims, 4 Drawing Sheets

HANDSFREE DEVICE AND MOBILE PHONE HANDSET

CROSS REFERENCE TO RELATED APPLICATION

This application is based on and incorporates herein by reference Japanese Patent Application No. 2004-242465 filed on Aug. 23, 2004.

FIELD OF THE INVENTION

The present invention relates to a handsfree device which provides a handsfree function by establishing a connection with a mobile phone handset, and a mobile phone handset which establishes a connection with the handsfree device.

BACKGROUND OF THE INVENTION

Nowadays, handsfree devices providing a handsfree function by establishing a connection with a mobile phone handset are used widely. Some of the handsfree devices receive a ring-tone signal from a mobile phone handset, when the handsfree device is connected with the handset and the handset receives a phone call. Then the handsfree devices produce a ring-tone sound according to the received ring-tone signal.

For example, in the case that a handsfree device establishes the connection with a mobile phone handset by means of the Bluetooth (registered trademark), which is used widely in recent years, the handset transmits an in-band ring-tone signal to the handsfree device, when the handset receives a phone call. In this case, the handsfree device sometimes produces a ring-tone sound as it is represented by the in-band ring-tone signal. The word "in-band" refers to a manner of sending/receiving a signal wherein the signal is sent/received by means of a SCO link, which is defined by the Bluetooth.

However, there is no conventional mobile phone handset which changes, according to a signal from the handsfree device, the ring-tone signal to be sent. In an opinion of the inventor of the present invention, this may cause some inconveniences.

For example, the Bluetooth restricts a frequency range in which the in-band ring-tone signal is allowed to be transmitted.

In addition, the Bluetooth allows a master device to establish connections with up to seven devices. Therefore, the mobile phone handset and the handsfree device can establish connections with each other through a plurality of wireless channels (namely, SCO links) at a time.

The above restriction varies depending on a state of the connection (namely, number of the channels). For example, when the number of the channels with which the connections are established decreases, the frequency range in which the in-band ring-tone signal is allowed to be transmitted from the handset to the handsfree device is narrowed.

If the handset transmits the in-band ring-tone signal irrespective of the variation of the restriction, the ring-tone signal within a certain frequency range is distorted through the transmission. As a result, the handsfree device possibly produces a distorted sound (ring-tone sound).

SUMMARY OF THE INVENTION

Based on the above description, the first objective of the present invention is to provide a handsfree device and a mobile phone handset which suppress, as much as possible, distortion of a ring-tone sound sent from the mobile phone handset caused by a restriction to a frequency range usable for the ring-tone signal.

The second objective of the present invention is to provide a handsfree device and a mobile phone handset which select whether or not to transmit a ring-tone signal from the mobile phone handset, based on a restriction to a frequency range usable for the ring-tone signal.

The first aspect of the present invention for achieving the first objective is as follows. A handsfree device comprises a communication circuit for maintaining a plurality of connections at a time with a mobile phone handset through a plurality of wireless channels, and makes a speaker output a sound depending on a received ring-tone signal, after receiving the ring-tone signal from the handset connected with the communication circuit. In addition, the handsfree device receives information on the handset transmitted from the handset, and transmits selection information to the handset, according to a state of the connections through the channels and the information on the handset. The selection information is for selecting the ring-tone signal to be transmitted from the handset.

Thus, the handsfree device transmits the information for selecting the ring-tone signal to the mobile phone handset, according to the state of the connections through the channels and the information on the handset. Therefore, the mobile phone handset can select the ring-tone signal which suffers less distortion and transmit the selected ring-tone signal to the handsfree device, according to the signal from the handsfree device to the mobile phone handset.

Besides, the information on the handset to be received may be information on a frequency range used by the ring-tone signal which the handset is capable of transmitting. Then, the handsfree device can make the selection according to the frequency range used by the ring-tone signal which the handset is capable of transmitting.

In this case, the handsfree device may transmit range information to the handset, wherein the range information is information on a restriction to the frequency range used by the ring-tone signal. In addition, the handsfree device may receive the information on the handset as a response to the transmitted range information. Thus, the information on the frequency range used by the ring-tone signal which the handset is capable of transmitting, which is transmitted from the handset, is based on the range information.

Besides, the handsfree device may transmit the selection information to the handset according to the received information on the handset, wherein the selection information is for selecting the ring-tone signal to be transmitted from the handset among a plurality of ring tone signals which the handset stores.

The second aspect of the present invention for achieving the second objective is as follows. A handsfree device comprises a communication circuit for maintaining a plurality of connections at a time with a mobile phone handset through a plurality of wireless channels, and makes a speaker output a sound depending on a received ring-tone signal, after receiving the ring-tone signal from the handset connected with the communication circuit, when the handset receives a phone call. In addition, the handsfree device transmits range information to the handset by means of the communication circuit. The range information is information on a restriction to the frequency range used by the ring-tone signal to be received. In addition, the handsfree device receives information on the handset transmitted from the handset by means of the communication circuit, wherein the information on the handset is transmitted by the handset as a response to the transmitted range information. According to the received information on the handset, the handsfree device transmits selection information to the handset by means of the communication circuit, wherein the selection information is for selecting whether or not to receive the ring-tone signal from the handset at the time when the handset receives a phone call. Moreover, the range information is changed depending on the state of the connections through the channels.

Thus, the handsfree device can toggle between acceptance and denial of the transmission of the ring-tone signal from the mobile phone handset, based on the changeable range information on the restriction to the frequency range.

In addition, in above aspects, the communication circuit may be for wirelessly maintaining the connections based on a protocol of the Bluetooth, and the transmission of the ring-tone signal may be an in-band transmission defined by the Bluetooth.

The third aspect of the present invention for achieving the first objective is as follows. A mobile phone handset comprises a handsfree communication circuit for maintaining a plurality of connections through a plurality of wireless channels at a time with a certain handsfree device. The handsfree device receives a ring-tone signal from the handset and outputs a ring-tone sound depending on the ring-tone signal to the speaker, when the handset receives a phone call. In addition, the mobile phone handset comprises a storage medium for storing a ring-tone dataset. In addition, the handset receives selection information for selecting the ring-tone signal transmitted from the handsfree device connected with the handsfree communication circuit. According to the received selection information, the handset determines the ring-tone signal for transmission corresponding to the ring-tone dataset stored by the storage medium, and transmits the determined ring-tone signal to the handsfree device by means of the handsfree communication circuit. The selection information is set by the handsfree device according to a state of the connections through the channels.

Thus, the handset determines the ring-tone signal for transmission according to the selection information for selecting the ring-tone signal transmitted from the handsfree device. Therefore, the handset can select the ring-tone signal which suffers less distortion and transmit the selected ring-tone signal to the handsfree device.

Besides, the handset may transmit information on the mobile phone handset by means of the handsfree communication circuit. In addition, the selection information from the handsfree device may be a response to the transmitted information on the mobile phone handset.

Thus, the selection information for selecting the ring-tone signal to be received is based on the information of the handset.

In addition, the handsfree communication circuit may be for wirelessly maintaining the connections based on a protocol of the Bluetooth, and the transmission of the ring-tone signal may be an in-band transmission defined by the Bluetooth. Moreover, the handset may determine the ring-tone signal for transmission according to a form of a transmission packet used for the in-band transmission as well as the received selection information.

The fourth aspect of the present invention for achieving the second objective is as follows. A mobile phone handset comprises a handsfree communication circuit for maintaining a plurality of connections through a plurality of wireless channels at a time with a certain handsfree device. The handsfree device receives a ring-tone signal from the handset and outputs a ring-tone sound depending on the ring-tone signal to the speaker, when the handset receives a phone call. In addition, the mobile phone handset comprises a storage medium for storing a ring-tone dataset. In addition, the handset receives a range information transmitted from the handsfree device, wherein the range information is information on a restriction to the frequency range used by the ring-tone signal to be received by the handsfree device. In addition, the handset transmits presence/absence information to the handsfree device according to comparison between the received range information and a frequency range used by the ring-tone dataset stored by the storage medium, wherein presence/absence information is information on the presence or absence of the ring-tone signal transmittable to the handsfree device. In addition, the handset receives acceptance/denial information transmitted by the handsfree device, as a response to the transmitted presence/absence information, wherein the acceptance/denial information is information on whether the handsfree device receives the ring-tone signal when the handset receives a phone call. In addition, the handset transmits the ring-tone signal depending on the ring-tone dataset stored by the storage medium to the handsfree device, based on that the received acceptance/denial information indicates that the handsfree device receives the ring-tone signal when the handset receives a phone call. Moreover, the range information is changed depending on the state of the connections through the channels.

Thus, the handset can transmit the presence/absence information on the presence or absence of the ring-tone signal transmittable to the handsfree device, according to the comparison between the received range information and a frequency range used by the ring-tone dataset. Then, the handset can toggle between acceptance and denial of the transmission of the ring-tone signal from the mobile phone handset, based on the response to the presence/absence information.

Besides, the handsfree communication circuit may be for wirelessly maintaining the connections based on a protocol of the Bluetooth, and the transmission of the ring-tone signal may be an in-band transmission defined by the Bluetooth.

BRIEF DESCRIPTION OF THE DRAWINGS

FIG. 3 is a time-series sequence chart showing operations of a connection between the handsfree device 1 and the mobile phone handset 2 and so on;

DETAILED DESCRIPTION OF THE INVENTION

Figure 1:
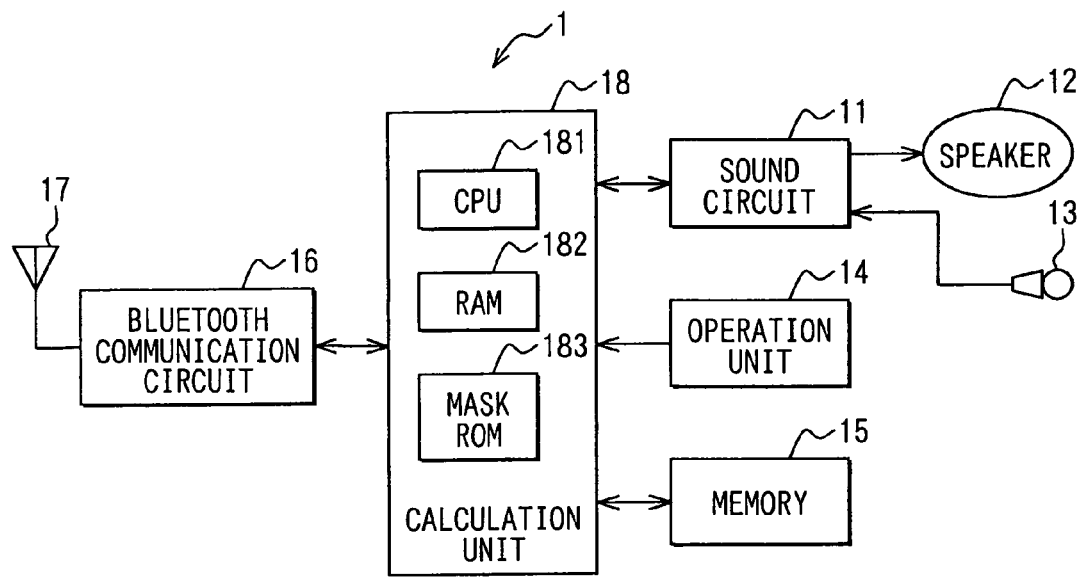
FIG. 1 shows a hardware structure of a handsfree device 1 according to an embodiment of the present invention.
Figure 2:
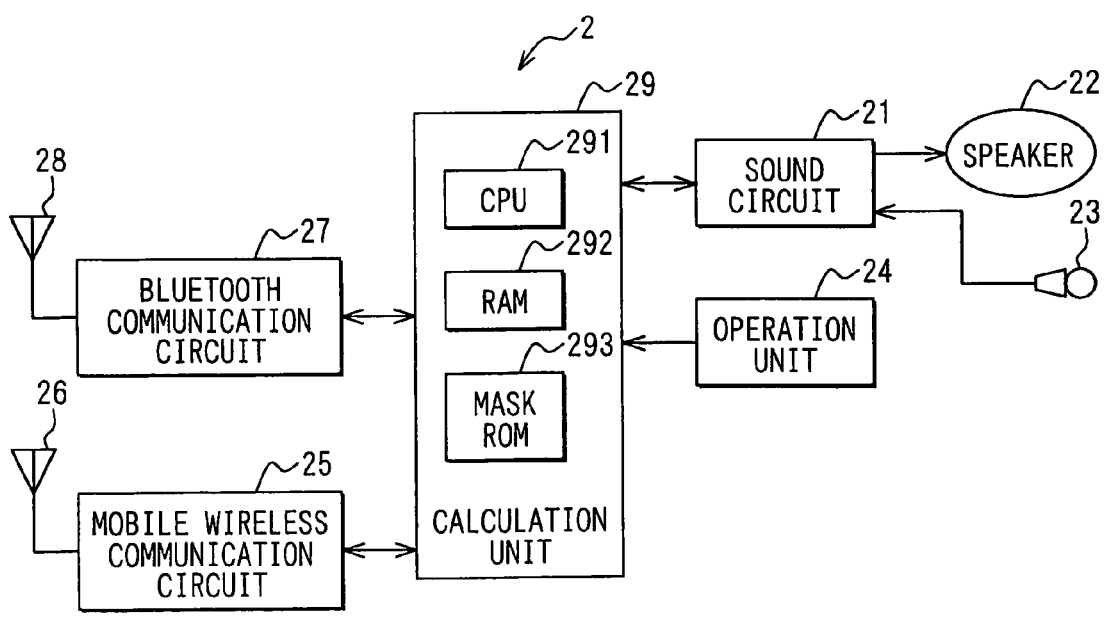
FIG. 2 shows a hardware structure of a mobile phone handset 2 according to the embodiment of the present invention.

Hereafter, an embodiment of the present invention will be described. FIG. 1 and FIG. 2 show hardware structures of a handsfree device 1 and a mobile phone handset 2 of the embodiment, respectively.

The handsfree device 1 is installed in a vehicle and includes a sound circuit 11, a speaker 12, a microphone 13, an operation unit 14, a memory 15, a Bluetooth communication circuit 16, a Bluetooth antenna 17, and a calculation unit 18.

The sound circuit 11 converts digital sound data outputted from the calculation unit 18 into analog data, and subsequently executes analog processes such as amplification. Then the sound circuit 11 outputs the resultant signal to the speaker 12. In addition, the sound circuit 11 executes predetermined analog processes to a sound signal from the microphone 13 such as amplification and converts the resultant signal to digital data. Subsequently, the sound circuit 11 outputs the resultant digital data to the calculation unit 18.

The operation unit 14 includes devices, such as mechanical switches, which can be operated by a user, and outputs, to the calculation unit 18, a signal depending on the operation of the user to the devices.

The memory 15 is a nonvolatile storage medium such as a flash memory or a volatile storage medium which keeps storing data continuously by receiving a power supply from a backup power source. In the present embodiment, the memory 15 stores a plurality of range information datasets for restricting frequency range, which are described later.

The communication circuit 16 executes predetermined frequency conversion, demodulation, amplification, and A/D conversion to a signal received from the antenna 17, according to a protocol of the Bluetooth. Subsequently, the communication circuit 16 outputs the resultant data to the calculation unit 18. In addition, the communication circuit 16 executes predetermined D/A conversion, amplification, modulation, and frequency conversion to data from the calculation unit 18, according to the protocol of the Bluetooth. Subsequently, the communication circuit 16 outputs the resultant data to the antenna 17. Thus, the communication circuit 16 is for maintaining connections with the handset 2.

The calculation unit 18 includes a CPU 181, a RAM 182, and a mask ROM 183. The CPU 181 reads and executes programs for its operation. In executing the programs, the CPU 181 writes data to the RAM 182 and the memory 15, and reads data from the RAM 182, the mask ROM 183, and the memory 15. In the operation, the CPU 181 receives signals from the sound circuit 11, the operation unit 14, and the communication circuit 16, and outputs signals to the sound circuit 11 and the communication circuit 16 as needed. The programs executed by the CPU 181 will be described later.

In addition, the handsfree device 1 of the present embodiment is a part of a car navigation device. Moreover, a handsfree function through the connection with the handset 2 is not the only function which the communication circuit 16 provides. For example, when the handset 2 and the car navigation device is connected with each other wirelessly, it is possible to browse contents in the Internet by means of a display screen of the car navigation device, by connecting the handset 2 with a server in the Internet wirelessly. In this case, the communication circuit 16 of the handsfree device 1 is connected with the handset 2 through two wireless channels at a time, in order to provide both the Internet function and the handsfree function. Hereafter, the handset 2 is described.

The handset 2 includes a sound circuit 21, a speaker 22, a microphone 23, an operation unit 24, a mobile communication circuit 25, a mobile communication antenna 26, a Bluetooth communication circuit 27, a Bluetooth antenna 28, and a calculation unit 29.

The sound circuit 21 converts digital sound data output from the calculation unit 29 into analog data, and subsequently executes analog processes such as amplification. Then the sound circuit 21 outputs the resultant signal to the speaker 22. In addition, the sound circuit 21 executes predetermined analog processes to a sound signal from the microphone 23 such as amplification and converts the resultant signal to digital data. Subsequently, the sound circuit 21 outputs the resultant digital data to the calculation unit 29.

The operation unit 24 includes devices, such as mechanical switches, which can be operated by a user, and outputs, to the calculation unit 29, a signal depending on the operation of the user to the devices.

The mobile communication circuit 25 is a well-known circuit for telephone communications. The mobile communication circuit 25 executes predetermined frequency conversion, demodulation, amplification, and A/D conversion, according to a protocol for mobile phone communications such as CDMA, to a signal received from the other party of the telephone communications through a base station of the telephone communications and the antenna 26. Subsequently, the mobile communication circuit 25 outputs the resultant data to the calculation unit 29. In addition, the mobile communication circuit 25 executes predetermined D/A conversion, amplification, modulation, and frequency conversion, according to the protocol for the mobile phone communications, to data from the calculation unit 29 for transmission to the other party. Subsequently, the mobile communication circuit 25 outputs the resultant data to the antenna 26 to transmit the resultant data to the base station.

The Bluetooth communication circuit 27 executes predetermined frequency conversion, demodulation, amplification, A/D conversion to a signal received from the Bluetooth antenna 28, according to the specifications of the Bluetooth. Subsequently, the Bluetooth communication circuit 27 outputs the resultant data to the calculation unit 29. In addition, the Bluetooth communication circuit 27 executes predetermined D/A conversion, amplification, modulation, and frequency conversion to data from the calculation unit 29, according to the specifications of the Bluetooth. Subsequently, the Bluetooth communication circuit 27 outputs the resultant data to the Bluetooth antenna 28. Thus, Bluetooth communication circuit 27 is for maintaining connections with the handset 2.

The calculation unit 29 includes a CPU 291, a RAM 292, and a mask ROM 293. The CPU 291 reads and executes programs for its operation. In executing the programs, the CPU 291 writes data to the RAM 292, and reads data from the RAM 292 and the mask ROM 293. In the operation, the CPU 291 receives signals from the sound circuit 21, the operation unit 24, the mobile communication circuit 25, and the Bluetooth communication circuit 27, and outputs signals to the sound circuit 21, the mobile communication circuit 25, and the Bluetooth communication circuit 27 as needed. The programs executed by the CPU 291 will be described later.

The mask ROM 293 includes a plurality of different types of ring-tone datasets for transmitting to the connected handsfree device 1, as well as the programs which the CPU 291 executes. Each of the ring-tone datasets includes digital data representing a ring-tone sound and information on a frequency range used by the ring-tone sound. The frequency range to be used varies among ring-tone sounds.

Hereafter, the operations of the handsfree device 1 and the handset 2 with the hardware structures as described above will be described with reference to FIGS. 3-5.

Figure 3:
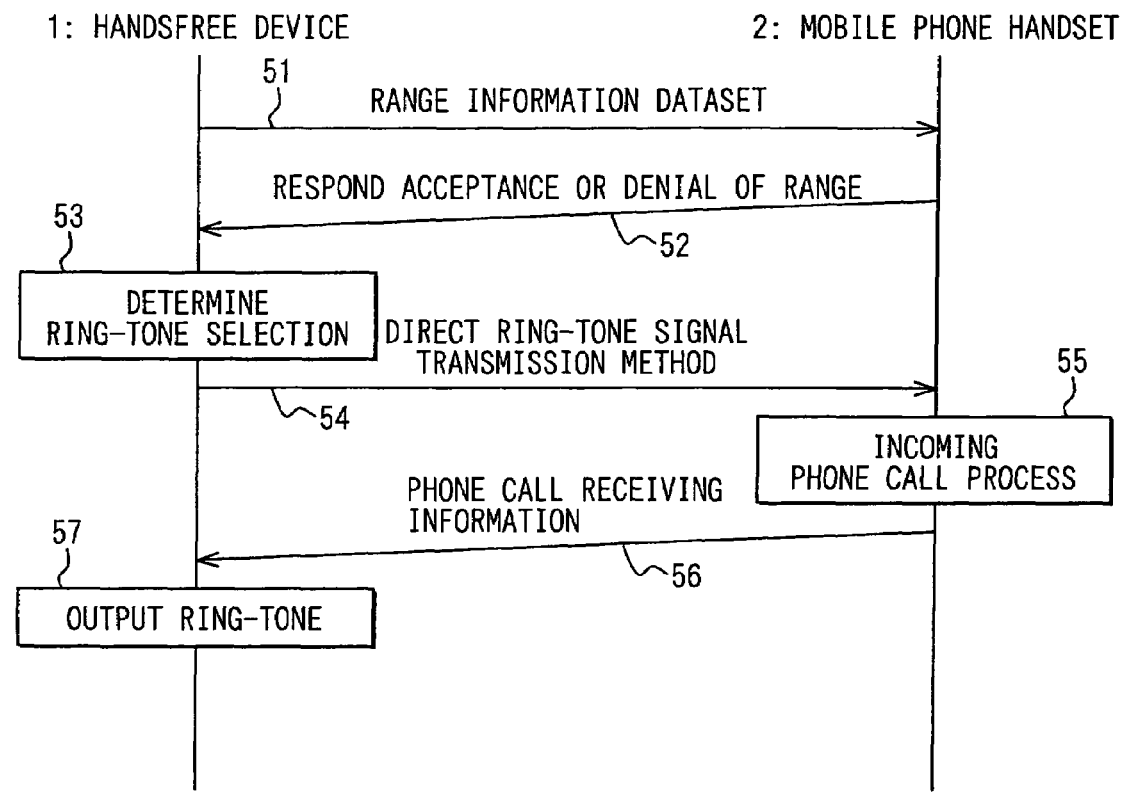

FIG. 3 is a time-series sequence chart showing operations after an establishment of a connection between the handsfree device 1 and handset 2, in which a ring-tone is determined, information of the determined ring-tone sound is transmitted from the handset 2 to the handsfree device 1, and the handsfree device 1 produces the ring-tone sound.

Figure 4:
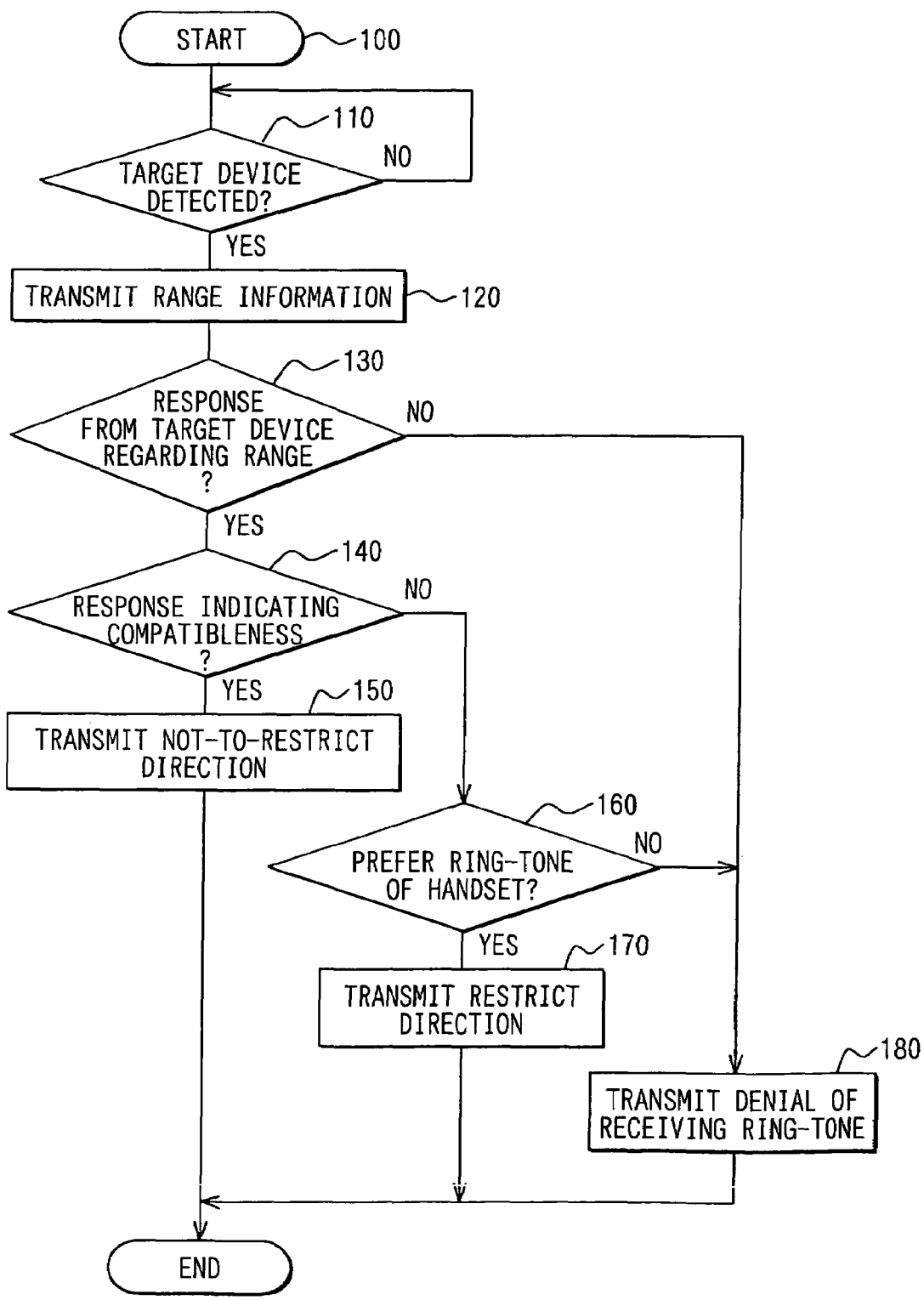
FIG. 4 is a flowchart showing a handsfree-side ring-tone determination program 100.

FIG. 4 is a flowchart showing a handsfree-side ring-tone determination program 100, which is executed by the CPU 181 of the handsfree device 1 for the operations.

Figure 5:
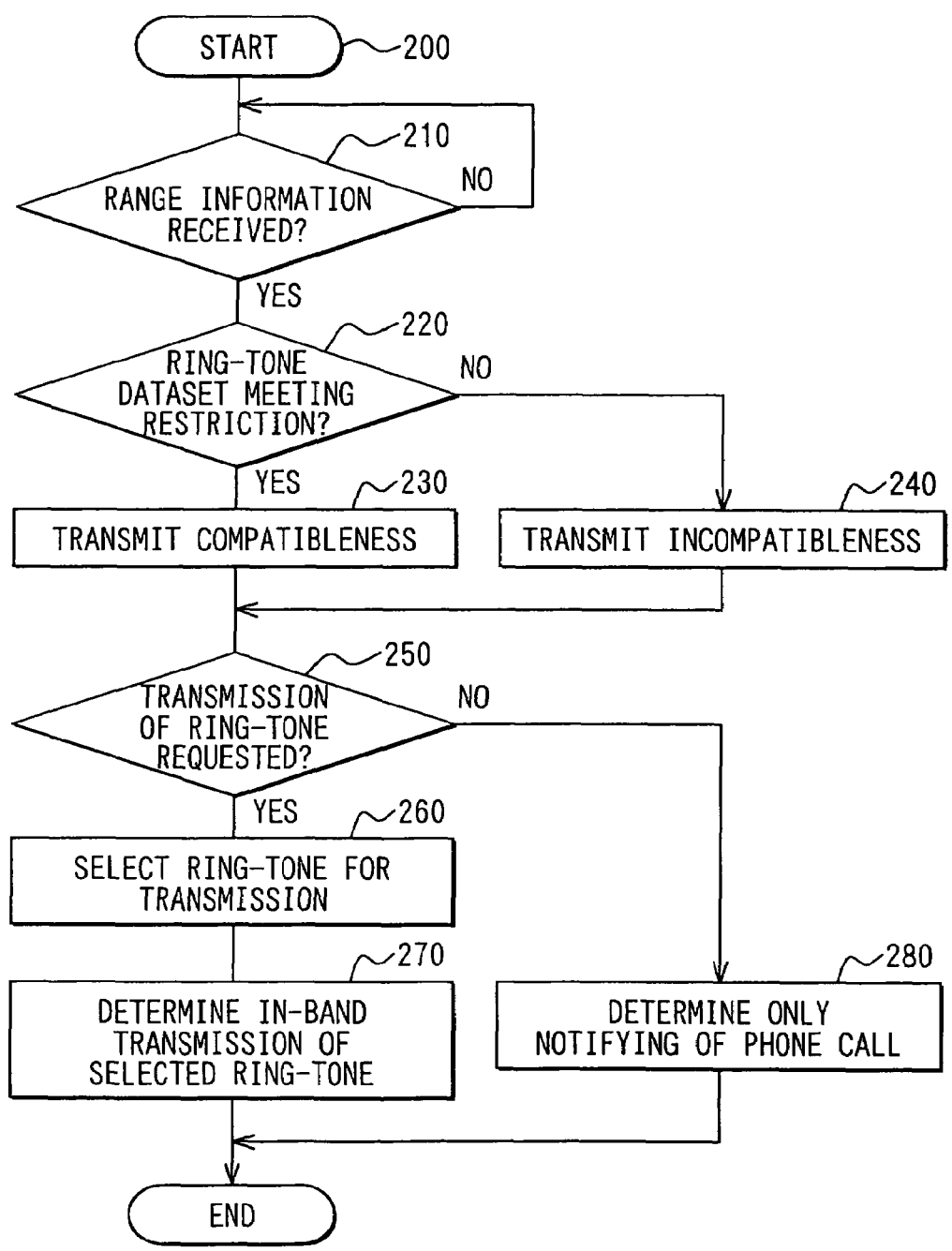
FIG. 5 is a flowchart showing a mobile-side ring-tone determination program 200.

FIG. 5 is a flowchart showing a mobile-side ring-tone determination program 200 which is executed by the CPU 291 of the handset 2 for the operations.

In describing the operations according to the flowcharts, it is supposed, as shown above, that the handset 2 is connected with the Internet in conjunction with the car navigation device which is not illustrated. In other words, it is supposed that the handsfree device 1 and handset 2 is maintaining a first Bluetooth link with each other by executing a well-known procedure. For example, the link is established when the CPU 181 uses the communication circuit 16 and the CPU 291 uses the Bluetooth communication circuit 27 to exchange data in a predetermined procedure.

When the user operates the handset 2 in a predetermined manner to utilize the handsfree function in the situation, the handsfree device 1 and the handset 2 establish a second Bluetooth link to each other by executing a well-known procedure. The link is established when the CPU 181 uses the communication circuit 16 and the CPU 291 uses the Bluetooth communication circuit 27 to exchange data in a predetermined procedure.

When the second Bluetooth link is established between the handsfree device 1 and the handset 2, the CPU 181 starts executing the program 100 and the handset 2 starts an execution by the CPU 291.

First, when the CPU 181 determines at a step 110 of the program 100 that a target device for the Bluetooth connection is detected, it subsequently executes a step 120.

At step 120, the CPU 181 selects one of the range information datasets stored in the memory 15, according to the number of the wireless channels being used for the connections at this time, and transmits the selected dataset to the handset 2 by means of the communication circuit 16. In this situation, two wireless links are maintained simultaneously at this time, and the range information dataset in the memory 15 is selected according to the fact. The range information dataset is selected so that a width of an allowed frequency range in the range information dataset is narrowed as the number of the wireless channels being used for the connections at a time.

The range information dataset includes information restricting the ring-tone signal to be transmitted from the handsfree device 1. The information on the restriction is based on a restriction to a frequency range of a sound which can be transmitted through an in-band transmission. Specifically, the information indicates a frequency range (more specifically, 50-7000 Hz at the widest if only a single wireless connection is maintained) within which a sound can be transmitted through the in-band transmission. The values in the memory 15 may be changed by a user's operation of the operation unit 14. The range information dataset corresponds to a signal 51 in FIG. 3.

Then, the CPU 291 of the handset 2 executes a step 210 recursively until it receives the range information dataset 51 by means of the Bluetooth communication circuit 27. When the CPU 291 receives the dataset 51, it compares at a step 220 the allowed frequency range in the dataset 51 with the frequency ranges in the ring-tone datasets stored in the mask ROM 183. If the comparison indicates that at least one of the ring-tone datasets includes a ring-tone sound within the allowed frequency range, the CPU 291 determines that the ring-tone dataset meets the restriction and subsequently executes a step 230. If the comparison indicates that all of the ring-tone datasets includes the ring-tone sounds protruding from the frequency range, the CPU 291 determines that no ring-tone dataset meets the restriction and subsequently executes a step 240.

At the step 230, the CPU 291 transmits information indicating that the handset 2 is compatible with the frequency range, to the handsfree device 1 by means of the Bluetooth communication circuit 27.

At the step 240, the CPU 291 transmits information indicating that the handset 2 is not compatible with the frequency range, to the handsfree device 1 by means of the Bluetooth communication circuit 27.

As described above, the information transmitted at the steps 230 and the 240 is presence/absence information of a ring-tone signal which can be transmitted to the handsfree device 1. In addition, the presence/absence information to be transmitted is information on the ring-tone signals in the handset 2, and is also information on the handset 2. The information on the handset 2 corresponds to a signal 52 in FIG. 3.

After executing the step 120, the CPU 181 of the handsfree device 1 waits, at a step 130, for receiving, by means of the communication circuit 16, the information on the handset 2 as a response to the range information dataset. The waiting continues for a predetermined period (e.g. 30 seconds) at the longest. If the CPU 181 receives the information in the period, it executes the ring-tone selection determination process 53 shown in FIG. 3. This process corresponds to steps 140-170 of the program 100.

At the step 140, the CPU 181 determines whether the received information on the handset 2 indicates that the handset 2 is compatible with the frequency range. If the received information does, the CPU 181 executes a step 150 subsequently. Otherwise, the CPU 181 executes a step 160 subsequently.

At the step 150, the CPU 181 transmits, by means of the communication circuit 16, a signal for directing not to restrict a frequency range. The directing signal indicates that the handsfree device 1 receives a ring-tone signal from the handset 2 when the handset 2 receives a phone call and that the ring tone signal to be received is selected in order to meet the range information dataset. The directing signal corresponds to a signal 54 for directing a ring-tone signal transmission method.

Subsequently to the step 150, the execution of the program 100 ends.

At the step 160, the CPU 181 determines whether the handsfree device 1 is preset to receive and use the ring-tone sounds in the handset 2 even if the ring-tone sounds do not meet the restriction. In other words, the CPU 181 determines whether the handsfree device 1 use the ring-tone sounds from the handset 2 in preference to a ring-tone sound stored in the mask ROM 183 of the handsfree device 1 beforehand.

Information indicating the setting is stored in the memory 15. The information can be modified by a user's operation to the operation unit 14 and may be stored in the mask ROM 183 beforehand. If the handsfree device 1 is preset to receive and use the ring-tone sound in the handset 2, the CPU 181 subsequently executes a step 170. If the handsfree device 1 is preset not to receive and use the ring-tone sound in the handset 2, the CPU 181 subsequently executes a step 180.

At the step 170, the CPU 181 transmits a signal for directing to restrict a frequency range, to the handset 2 by means of the communication circuit 16. The directing signal indicates that the handsfree device 1 receives the ring-tone signal from the handset 2 and that the ring tone signal to be received is selected according to a form of a transmission packet used for the in-band transmission. The directing signal corresponds to the signal 54 for directing the ring-tone signal transmission method. Subsequently to the step 170, the execution of the program 100 ends. The form of the transmission packet used for the in-band transmission is described later.

At the step 180, the CPU 181 transmits a denial signal to the handset 2 by means of the communication circuit 16. The denial signal indicates denial of receiving the ring-tone sound. The denial signal corresponds to the signal 54 for directing the ring-tone signal transmission method, which is shown in FIG. 3. Subsequently to the step 180, the execution of the program 100 ends.

In addition, if the CPU 181 has not received at the step 130 the information on the handset 2 in the predetermined period, it subsequently transmits at the step 180 the denial signal to the handset 2 by means of the communication circuit 16 and terminates executing the program 100.

After transmitting the information on the handset 2 at the step 230 or the step 240, the CPU 291 waits at a step 250 for receiving, by means of the Bluetooth communication circuit 27, the signal 54 for directing the ring-tone signal transmission method. When the CPU 291 receives the signal 54, it determines whether the signal is requesting for a transmission of the ring-tone signal. Among the signals 54 for directing the ring-tone signal transmission method, the signal for directing not to restrict a frequency range (see the step 150 in FIG. 4) and the signal for directing to restrict a frequency range (see the step 170) correspond to the request signal requesting for the transmission of the ring-tone signal. If the CPU 291 receives the request signal, it subsequently executes a step 260. If the CPU 291 does not receive the request signal, that is, if the CPU 291 receives the denial signal (see the step 180), it subsequently executes a step 280.

At the step 260, the CPU 291 selects a ring-tone signal to transmit. The method of the selection varies between (1) the case that the received signal 54 is the signal for directing not to restrict the frequency range and (2) the case that the received signal 54 is the signal for directing to restrict the frequency range. Hereafter the method of the selection is described in each of the cases.

(1) In the case that the received signal 54 is the signal for directing not to restrict the frequency range:

the CPU 291 chooses the ring-tone dataset which is determined at the step 220 to be confined within the frequency range included in the allowed frequency range regarding the received range information, as a ring-tone dataset to transmit on receiving a phone call. In other words, the CPU 291 chooses the ring-tone dataset which meets the range information, as the ring-tone dataset to transmit on receiving a phone call. If the handset 2 has a plurality of ring-tone datasets which meet the range information, the CPU 291 selects one of the datasets in a random manner. In addition, the handset 2 may determine a selection of a ring-tone datasets for transmission on receiving a phone call among the plurality of the ring-tone datasets. If a ring-tone dataset selected by the selection meets the range information, the CPU 291 may choose in preference the dataset as the ring-tone dataset to transmit on receiving a phone call without choosing in a random manner.

(2) In the case that the received signal 54 is the signal for directing to restrict the frequency range:

the CPU 291 chooses a ring-tone signal according to the form of the transmission packet used for the in-band transmission. According to the Bluetooth, the in-band transmission is made on a symmetric type point-to-point physical layer link called as a SCO link. Three types of packets, namely HV1 packets, HV2 packets, and HV3 packets, are used for the in-band transmission. Although the packets are not retransmitted In the SCO link, the transmitted packets are made to be redundant for data correction. The degree of redundancy of the packets depends on which type the packets belong to. Specifically, in transmitting data of 64 kbps, the HV1 packets are more redundant than the HV2 packets and the HV3 packets are not redundant. Therefore, the HV1 packets are most redundant, the HV2 packets are second-most redundant, and the HV3 packets are least redundant.

Specifically, the choosing of the ring-tone dataset according to the form of the transmission packet is made as follows. If a packet used in the current correction is the HV1 packet, the CPU 291 chooses a ring-tone dataset among all of the ring-tone datasets which the handset 2 has in a random manner. If the packet used in the current connection is the HV2 packet or the HV3 packet, the CPU 291 chooses the ring-tone dataset which has the ring-tone sound confined in the narrowest frequency range of all the ring-tone datasets which handset 2 has.

Subsequently to the step 260, the CPU 291 determines at a step 270 the ring-tone signal selected at the step 260, as the ring-tone signal to transmit on receiving a phone call. Specifically, the CPU 291 turns on a ring-tone signal transmission flag in a storage area of the RAM 292. The ring-tone signal transmission flag indicates whether or not to transmit the selected ring-tone signal on receiving a phone call. Subsequently to the step 270, the execution of the program 200 ends.

At the step 280, the CPU 291 determines to transmit the ring-tone signal on receiving a phone call. Specifically, the CPU 291 turns off the ring-tone signal transmission flag. Subsequently to the step 280, the execution of the program 200 ends.

When the handset 2 receives a phone call after determining of transmitting or not transmitting of the ring-tone signal and determining of the ring-tone sound to transmit as described above, the CPU 291 of the handset 2 reads and executes a program for processing the incoming phone call in the mask ROM 293. This corresponds to an incoming phone-call process 55 of FIG. 3.

In executing the incoming phone-call process 55, the CPU 291 reads the value of the ring-tone signal transmission flag. If the value is ON, the CPU 291 transmits a signal notifying of the phone call and a ring-tone signal generated from the ring-tone dataset chosen at the step 260, to the handsfree device 1 by means of the Bluetooth communication circuit 27, by using the in-band transmission. If the value is OFF, the CPU 291 does not transmit the ring-tone signal and transmits only the signal notifying of the phone call to the handsfree device 1 by means of the Bluetooth communication circuit 27. The signal notifying of the phone call corresponds to a signal 56 in FIG. 3. The pair of the signal notifying of the phone call and the ring-tone signal also corresponds to the signal 56 in FIG. 3.

When the CPU 181 of the handsfree device 1 receives the signal 56 by means of the communication circuit 16, it reads and executes a program in the mask ROM 183 for outputting the ring-tone sound. This corresponds to a ring-tone sound output process 57 shown in FIG. 3.

Then, if the received signal 56 includes the ring-tone signal, the CPU 181 outputs the ring-tone signal to the sound circuit 11. If the received signal 56 does not include the ring-tone signal, the CPU 181 reads the ring-tone dataset in the mask ROM 183 and output the dataset to the sound circuit 11. Then the handsfree device 1 produces a ring-tone sound.

When the user makes an operation for off-hook after the handsfree device 1 produces the ring-tone sound by means of the speaker 12, the CPU 181 transmits a signal notifying the off-hook operation to the handset 2 by means of the communication circuit 16. When the CPU 291 receives the notifying signal by means of the mobile communication circuit 25, it controls the mobile communication circuit 25 to start a phone conversation requested by the phone call.

During the phone conversation, the handset 2 transmits, to the handsfree device 1 by means of the Bluetooth communication circuit 27, voice data received by means of the mobile communication circuit 25 from the other party of the phone conversation. In addition, the handset 2 transmits, to the base station by means of the mobile communication circuit 25, voice data of the user for transmission received by means of the Bluetooth communication circuit 27 from the handsfree device 1, with making its destination the other party of the phone conversation.

Furthermore during the phone conversation, the handsfree device 1 receives, by means of the communication circuit 16, the voice data of the other party from the mobile communication circuit 25, and outputs the received data to the sound circuit 11. Then, the speaker 12 outputs a voice of the other party. In addition, the handsfree device 1 receives voice data of the user, which was received by the microphone 13, from sound circuit 11, and transmits, by means of the communication circuit 16, the received voice data to the handset 2 as data for transmission for the other party.

By means of the operations of the handsfree device 1 and the handset 2, the user can have a phone conversation through the handset 2 by using the speaker 12 and the microphone 13 of the handsfree device 1.

As described above, by virtue of the CPU 181 executing the program 100 and so on, the handsfree device 1 transmits (see the step 120) the range information to the handset 2 connected with the handsfree device 1 through the communication circuit 16. When the handsfree device 1 receives (see the step 130) the information of the frequency ranges used by the ring-tone signals in the handset 2, it makes the determination according to the received information (see the step 140). If the received information indicates that the handset 2 is compatible with the range information, it transmits the signal for directing not to restrict a frequency range (see the step 150). If the received information indicates that the handset 2 is not compatible with the range information, it transmits either of the signal for directing to restrict a frequency range (see the step 170) or the denial signal denying the reception of the ring-tone sound (see the step 180), depending on the setting (see step 160) as to whether it receives and uses the ring-tone sound even if the handset 2 is not compatible with the range information.

Thus, according to the received information on the handset 2, the handsfree device 1 transmits information for selecting the ring-tone signal to the handset 2. Therefore, the handsfree device 1 and the handset 2 can change a ring-tone signal to another ring-tone signal which suffers smaller distortion.

In addition, the received information on the handset 2 is the information as to whether the frequency ranges of the ring-tone datasets in the handset 2 meets the range information. The information is also the information on the frequency ranges of the ring-tone signals which the handset 2 can transmit. Therefore, the handsfree device 1 can make the selection according to the frequency ranges of the ring-tone signals which the handset 2 can transmit.

In addition, the signal 54 for directing the transmission method transmitted (see the steps 150, 170, and 180 in FIG. 4) by the handsfree device 1 is a signal indicating a reference for making the handset 2 select the ring-tone sound to transmit. Therefore, the signal 54 is also information as to which ring-tone sound the handsfree device 1 receives among the multiple types of the ring-tone sounds in the handset 2. In addition, the signal 54 is also the signal directing the handset 2 to transmit or not to transmit the ring-tone signal. Thus, the handsfree device 1 can toggle between acceptance and denial of the transmission of the ring-tone signal, based on, if any, the range information on the restriction to the frequency range used by the ring-tone signal In addition, as described above, by virtue of the CPU 291 executing the program 200 and so on, the handset 2 receives (see the step 210) the range information from the handsfree device 1 by means of the Bluetooth communication circuit 27. Then, the handset 2 determines (see the step 220) whether the received range information is compatible with its own ring-tone datasets, by comparing the information and the datasets. According to the determination, the handset 2 outputs (see the steps 230 and 240) the information regarding whether the ring-tone datasets are compatible or incompatible with the frequency range. When the handset 2 receives (see the step 250) the signal for directing the ring-tone signal transmission method, it determines, according to the received signal, whether or not to transmit the ring-tone signal (see the steps 270 and 280), and determines, according to the received signal, which ring-tone signal to transmit (see the step 260). Thus, the handset 2 is compatible with the function in which the ring-tone sound can be changed according to the signal from the handsfree device 1 to the handset 2. In addition, the handset 2 can toggle between transmitting and not transmitting of the ring-tone signal.

In the embodiment described above, the Bluetooth communication circuit 16 corresponds to the communication circuit.

In addition, the CPU 181 operates as a ring-tone sound output controlling means, by executing the program for the ring-tone sound output process 57 shown in FIG. 3.

In addition, the CPU 181 operates as a reception controlling means, by executing the step 130 of the program 100.

In addition, the CPU 181 operates as a transmission controlling means, by executing the steps 150, 170, and 180 of the program 100.

In addition, the CPU 181 operates as a range information transmission controlling means, by executing the step 120 of the program 100.

In addition, the RAM 292 and the mask ROM 293 of the handset 2 correspond to a storage medium, and the Bluetooth communication circuit 27 corresponds to a handsfree communication circuit.

In addition, the CPU 291 operates as a ring-tone selection reception controlling means and a ring-tone acceptance/denial reception control means, by executing the step 250 of the program 200.

In addition, the CPU 291 operates as a transmission ring-tone determining means, by executing the step 260 of the program 200.

In addition, the CPU 291 operates as a ring-tone transmission controlling means, by executing the program for the incoming phone-call process 55 shown in FIG. 3.

In addition, the CPU 291 operates as a handset information transmission controlling means and a ring-tone compatible/incompatible transmission control means, by executing the steps 220, 230, and 240 of the program 200.

Here, in the above embodiment, the handset 2 changes the methods of selecting the ring-tone signal for transmission, between the two cases. In one of the cases the HV1 packet is used in the current connection and in the other case the HV2 packet and the HV3 packet are used. However, the handset 2 may further change the methods between the case in which the HV2 packet is used and the case in which the HV3 packet is used. For example, the handset 2 may select the method as described in the embodiment when the HV3 packet is used in the current connection. In addition, when the HV2 packet is used in the current connection, the handset 2 may select in a random manner a ring-tone dataset as a ring-tone signal to transmit, among ring tone datasets which are confined to a reference frequency range (e.g. 50-3400 Hz) which is wider than the allowed frequency range in the range information received from the handsfree device 1.

In addition, in the above embodiment, the handset 2 selects the single ring-tone dataset for transmission among the plurality of the ring-tone datasets. However, the operation is not the definite one. For example, if the CPU 291 of the handset 2 is capable of generating ring-tone signals with various frequency range from a single ring-tone dataset through a well-known processes for frequency conversion, the handset 2 may generate a ring-tone signal which is compatible with the range information from the handset 2, from the ring-tone dataset.

In addition, in the above embodiment, the handset 2 transmits at the step 230 and the step 240 the information regarding whether the ring-tone datasets are compatible with the received range information to the handsfree device 1. However, the operation is not the definite one. For example, the handset 2 may transmit its own ring-tone datasets and the information on the frequency range used by the ring-tone datasets. Then, the handsfree device 1 may select one of the ring-tone datasets according to the range information in the memory 15 and transmit a designation of the selected ring-tone dataset to the handset 2. Then the handset 2 may transmit the ring-tone signal regarding the designated ring-tone dataset.

In addition, in the embodiment, the information on the handset 2 transmitted by the handset 2 is the information on the frequency ranges of the ring-tone datasets. However, the operation is not the definite one. For example, the information transmitted by the handset 2 may be a model name of the handset 2. Then the handsfree device 1 may specify a ring-tone sound compatible with the current connection according to the received model name and transmit a signal designating the specified ring-tone sound to the handset 2. Furthermore, the handset 2 may transmit a ring-tone signal regarding the designated ring-tone dataset. In this case, the handsfree device 1 may have correspondence data for specifying correspondence of a machine name to a ring-tone sound and compatibility information (e.g. information on frequency range) with the current connection regarding the ring-tone sound.

Moreover, the handsfree device 1 of the embodiment may be made with a navigation device as a single body.

What is claimed is:

1. A handsfree device, comprising:
    a communication circuit for simultaneously maintaining a plurality of connections with a mobile phone handset, through a plurality of wireless channels;
    ring-tone sound output controlling means for making a speaker output a sound depending on a received ring-tone signal, after receiving the ring-tone signal from the mobile phone handset connected with the communication circuit;
    reception controlling means for receiving, by means of the communication circuit, information on the mobile phone handset transmitted from the mobile phone handset;
    transmission controlling means for transmitting selection information to the mobile phone handset by means of the communication circuit, according to a state of the connections through the channels and the information on the mobile phone handset received by the reception controlling means, for selecting the ring-tone signal to be transmitted from the mobile phone handset; and
    range information transmission controlling means for transmitting range information to the mobile phone handset by means of the communication circuit, the range information being information on a restriction to a frequency range used by the ring-tone signal to be received by the ring-tone sound output controlling means, the range information being changed depending on the state of the connections through the channels.

2. The handsfree device according to claim 1, wherein the information on the mobile phone handset received by the reception controlling means is information on the frequency range used by the ring-tone signal which the mobile phone handset is capable of transmitting.

3. The handsfree device according to claim 2, wherein:
    the information on the mobile phone handset received by the reception controlling means is transmitted by the mobile phone handset as a response to the range information transmitted from the range information transmission controlling means.

4. The handsfree device according to claim 1, wherein the transmission controlling means transmits the selection information to the mobile phone handset by means of the communication circuit, according to the information on the mobile phone handset received by the reception controlling means, wherein the selection information is for selecting the ring-tone signal to be transmitted from the mobile phone handset among a plurality of ring tone signals which the mobile phone handset stores.

5. The handsfree device according to claim 1, wherein the communication circuit is for wirelessly maintaining the connections based on a protocol of the Bluetooth, and the transmission of the ring-tone signal is an in-band transmission defined by the Bluetooth.

6. The handsfree device according to claim 1, wherein the frequency range always includes frequencies above 50 Hz.

7. The handsfree device according to claim 1, wherein the frequency range always includes frequencies between 50 Hz and 7000 Hz.

8. A handsfree device, comprising:
    a communication circuit for simultaneously maintaining a plurality of connections with a mobile phone handset, through a plurality of wireless channels;
    ring-tone sound output controlling means for making a speaker output a sound depending on a received ring-tone signal, after receiving the ring-tone signal from the mobile phone handset connected with the communication circuit, when the mobile phone handset receives a phone call;
    range information transmission controlling means for transmitting range information to the mobile phone handset by means of the communication circuit, the range information being information on a restriction to a frequency range used by the ring-tone signal to be received by the ring-tone sound output controlling means, and the range information further being changed depending on a state of the connections through the channels;
    reception controlling means for receiving, by means of the communication circuit, information on the mobile phone handset transmitted from the mobile phone handset as a response to the range information transmitted by the range information transmission controlling means; and
    transmission controlling means for transmitting selection information to the mobile phone handset by means of the communication circuit, according to the information on the mobile phone handset received by the reception controlling means, the selection information being for selecting whether to receive the ring-tone signal from the mobile phone handset when the mobile phone handset receives a phone call.

9. The handsfree device according to claim 8, wherein the frequency range always includes frequencies above 50 Hz.

10. The handsfree device according to claim 8, wherein the frequency range always includes frequencies between 50 Hz and 7000 Hz.

11. A mobile phone handset, comprising:

a storage medium for storing a ring-tone dataset;

a handsfree communication circuit for maintaining a plurality of connections through a plurality of wireless channels at a time with a handsfree device, which receives a ring-tone signal from the mobile phone handset and outputs a ring-tone sound depending on the ring-tone signal to the speaker, when the mobile phone handset receives a phone call;

range information reception controlling means for receiving, by means of the handsfree communication device, a range information transmitted from the handsfree device, the range information being information on a restriction to a frequency range used by the ring-tone signal to be received by the handsfree device and the range information being changed depending on the state of the connections through the channels;

ring-tone compatible/incompatible transmission control means for transmitting presence/absence information to the handsfree device by means of the handsfree communication circuit, according to comparison between the range information which the range information reception controlling means received and a frequency range used by the ring-tone dataset stored by the storage medium, the presence/absence information being information on the presence or absence of the ring-tone signal transmittable to the handsfree device;

ring-tone acceptance/denial reception control means for receiving, by means of the handsfree communication circuit, acceptance/denial information transmitted by the handsfree device, as a response to the presence/absence information transmitted by the ring-tone compatible/incompatible transmission control means, the acceptance/denial information being information on whether the handsfree device receives the ring-tone signal when the mobile phone handset receives a phone call; and ring-tone transmission controlling means for transmitting, by means of the handsfree communication circuit, the ring-tone signal depending on the ring-tone dataset stored by the storage medium to the handsfree device, based on that the acceptance/denial information received by the ring-tone acceptance/denial reception control means indicates that the handsfree device receives the ring-tone signal when the mobile phone handset receives a phone call.

12. The mobile phone handset according to claim 11, wherein the handsfree communication circuit is for wirelessly maintaining the connections based on a protocol of the Bluetooth, and the transmission of the ring-tone signal is an in-band transmission defined by the Bluetooth.

* * * * *